2,818,395

PREPARATION OF CATION-EXCHANGE RESINS FROM VINYL THIOCYANATE

Jesse C. H. Hwa, Levittown, Pa., assignor to Rohm & Haas Company, Philadelphia, Pa., a corporation of Delaware No Drawing. Application June 1, 1955
Serial No. 512,570

8 Claims. (Cl. 260—2.2)

This invention relates to cation-exchange resins and their preparation. It relates to the preparation of cation-exchange resins which contain strongly acidic sulfonic acid groups and which may also contain weakly acidic carboxyl groups.

The object of this invention is to provide a method of making cation-exchange resins of the sulfonic type and of the carboxy-sulfonic type.

In one aspect of this invention, insoluble polymers of vinyl thiocyanates are chemically converted to sulfonic acid resins having cation-exchange properties. In another aspect, copolymers of vinyl thiocyanate and lower alkyl esters of acrylic or methacrylic acids are converted to copolymers containing both sulfonic acid groups and carboxyl groups as their polar, cation-exchanging groups.

The products of this invention are insoluble in aqueous solutions of acids, bases and salts; and they are capable of adsorbing cations by virtue of containing recurring units having the configuration

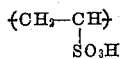

In addition to the sulfonic acid units they may also contain recurring units of the configuration

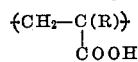

in which case the products are carboxy-sulfonic cation-exchange resins. In the second formula, R represents a hydrogen atom or a methyl group.

The instant products are made by treating insoluble copolymers of vinyl thiocyanate with aqueous solutions of oxidizing agents. Such copolymers are described in another of my applications for Letters Patent, Serial No. 512,569, filed June 1, 1955.

In order to obtain an insoluble polymer for reaction with the aqueous oxidizing agents, vinyl thiocyanate is copolymerized with a copolymerizable compound which contains two or more non-conjugated vinylidene groups of the structure, $CH_2=C<$. Such comonomers serve as cross-linking agents. At present, divinylbenzene is much the preferred cross-linking agent; but others which can be used include divinyltoluene, trivinylbenzene, divinylnaphthalene, diallylphthalate, and ethylene glycol diacrylate or dimethacrylate.

As little as 0.5% of the cross-linking agent, on a molar basis, has a cross-linking effect as evidenced by decreased solubility. And as much as 50%, on the same basis, has been used. It is, however, preferred to employ from about 1% to about 20% of the polyvinyl cross-linker, on a molar basis.

The mixtures of monomeric vinyl thiocyanate and the monomeric polyvinyl cross-linking agent can be polymerized in bulk, in solution, in aqueous suspension or in aqueous emulsion. For purposes of this invention, it is much preferred that the mixtures be polymerized in aqueous suspension because this leads to the formation of the insoluble copolymers in the shape of small beads or spheroids. Such resinous particles retain their shape throughout the reaction with aqueous oxidizing agents; and the resultant ion-exchange resins are in an ideal form for use in ion-exchange processes.

In the preparation of the carboxy-sulfonic resins of this invention, a monomeric, copolymerizable ester of acrylic acid or methacrylic acid is included in the mixture of monomeric vinyl thiocyanate and monomeric polyvinyl cross-linking agent to be polymerized. Any amount of the unsaturated ester can be mixed and copolymerized, depending on the ratio of ion-exchanging sulfonic acid groups to carboxyl groups which is desired in the final cation-exchange resin. Ordinarily, however, the amount of ester to be copolymerized is about equal to the amount of the vinyl thiocyanate, on a molar basis, or less. Since in a subsequent reaction the ester portions of the copolymers are hydrolyzed to carboxyl groups, it is more economical, and hence preferred, to employ the lower alkyl esters of the acrylic or methacrylic acids, particularly the methyl or ethyl esters.

The copolymerization of all of the monomeric mixtures is carried out at any convenient temperature. But, since heat and catalysts accelerate such polymerizations, it is preferred to carry out this step at temperatures above 50° C. in the presence of a catalyst of the free radical type. When copolymerization is carried out in aqueous suspension, temperatures above 50° C. and up to the boiling point of the reaction mixture can be employed. Temperatures from about 60° C. to about 90° C. are, however, recommended.

Suitable catalysts for the copolymerization are those customarily used to accelerate polymerizations of the vinyl or addition type. Typical of such catalysts are the following: $\alpha,\alpha'$-bis-azoisobutyronitrile, dimethyl azobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "persalts" such as ammonium persulfate and ammonium perborate. The catalysts are used in amounts from 0.2% to 5%, and preferably from 0.5% to 2%, based on the weight of the copolymerizable compounds.

In the reaction with the aqueous oxidizing agents, the insoluble copolymers of vinyl thiocyanate are used in the form of particles. Such particles may be the spheroidal particles resulting from suspension polymerization, as mentioned above, or they may be the particles obtained by grinding or otherwise comminuting a copolymer formed by bulk polymerization, for example.

The particles of the insoluble copolymers of vinyl thiocyanate are converted to the ion-exchanging products containing sulfonate groups by reaction with an aqueous solution of an oxidizing agent. Aqueous solutions of the following oxidizing agents have been used: hydrogen peroxide, chlorine, sodium hypochlorite, calcium hypochlorite, nitric acid, potassium permanganate, peracetic acid, performic acid and potassium dichromate. Of these, hydrogen peroxide is much preferred because of the ease and efficiency of reaction, particularly when the pH of the solution is above 7. Temperatures from room temperature up to the boiling point of the aqueous solution can be used depending on the speed of reaction which is required. In commercial practice, temperatures from about 40° C. to about 60° C. are employed because at such temperatures the reaction is easily controlled. Agitation, of course, is recommended.

In those cases where the copolymer contains ester groups, it is much preferred to first hydrolyze such groups to carboxylate groups by means of an alkaline solution. Suitable hydrolyzing media include aqueous or alcoholic solutions of alkali metal hydroxides, particularly sodium hydroxide or potassium hydroxides. Solutions of conventional organic quaternary ammonium hydroxides, e. g. trimethylbenzylammonium hydroxide, can also be used. What is required is that the hydrolyzing solution be alkaline. After the hydrolysis step, the copolymer is reacted with an aqueous solution of an oxidizing agent—preferably with an alkaline solution of hydrogen peroxide. In this way, a resin containing both carboxyl and sulfonic acid groups is readily prepared.

The products of this invention are in reality insoluble polyethylene sulfonic acids linked by a copolymerized compound—preferably divinylbenzene—which, in the monomeric form, contains two or more groups of the structure $CH_2=C<$. The products of this invention also include carboxy-sulfonic cation-exchangers which are insoluble copolymers of ethylene sulfonic acid and acrylic acid or methacrylic acid, the copolymers being cross-linked by a copolymerized compound which, in the monomeric form, contains two or more groups of the structure, $CH_2=C<$.

Such resins can also be made by the process of another of my applications for Letters Patent, Serial No. 485,315, filed January 31, 1955, now abandoned and replaced by Serial No. 571,877, filed March 16, 1956.

These products are capable of exchanging cations and, hence, are useful in deionization processes and in the softening of water. Thus, the sulfonic acid groups and the carboxyl groups exchange their hydrogen ions for the ions of metals such as sodium, potassium, calcium, magnesium, iron, cobalt, lead, et cetera. After the resins have adsorbed their full capacity of metallic ions, they are regenerated to the acid form by treatment with a strong acid, such as hydrochloric acid or sulfuric acid.

The following examples, in which all parts are by weight, serve to illustrate further the preparation and properties of the resins of this invention:

Example I

A mixture of 255 parts of vinyl thiocyanate, 29.1 parts of commercial divinylbenzene (approximately 50% divinylbenzene) and 3 parts of dimethyl azobisisobutyrate was suspended in an aqueous phase consisting of 1000 parts of water and 85 parts of a 1.5% aqueous dispersion of magnesium silicate. The mixture was stirred and heated under an atmosphere of nitrogen at 88° to 92° C. for 8 hours. The hard, spheroidal particles of resin were then filtered off, thoroughly washed, and dried.

A mixture of 100 parts of the dried resin, 200 parts of sodium hydroxide, 800 parts of water and 160 parts of 30% hydrogen peroxide was stirred and heated to 80° C. in one hour in a reactor equipped with stirrer, thermometer and reflux condenser. Stirring and heating at 80° C. was continued for 8 hours, after which the beads of resin were removed by filtration and were thoroughly washed with water. The resin was next converted to the hydrogen form by soaking in a large excess of 2N HCl for three hours, after which it was washed free of acid with water. The product had a cation-exchange capacity of 3.46 milliequivalents per gram, dry.

Example II

In a similar manner, a cross-linked copolymer of 85% vinyl thiocyanate and 15% divinylbenzene (technical grade, containing approximately 50% divinylbenzene), in the form of spheroids, was heated at 45° to 50° C. for 16 hours in a 10% aqueous solution of hydrogen peroxide which also contained 20% acetic acid. The cation-exchange resin which was separated and thoroughly washed had a cation-exchange capacity of over five milliequivalents per gram (dry basis).

Example III

An insoluble, cross-linked terpolymer was prepared in spheroidal form by the method described above from a mixture containing 35% vinyl thiocyanate, 57% ethyl acrylate and 8% technical divinylbenzene. This product was next reached for 20 hours with ten times its volume of a 15% alcoholic solution of sodium hydroxide at refluxing temperature. The ethyl ester groups were thereby converted to sodium carboxylate groups. The resin was next washed with water and was then converted to the hydrogen or acid form by treatment with an excess over the calculated amount of a 4% aqueous solution of sulfuric acid. After being washed thoroughly, the resin was tested for cation-exchange capacity with a dilute solution of calcium chloride. It was found to have a capacity of 5.6 milliequivalents per gram on a dry basis. Its salt-splitting capacity, i. e. its ability to remove sodium ions from a solution of sodium chloride, was, however, negligible.

The resin, after regeneration to the hydrogen form by means of a 4% solution of hydrochloric acid, was heated at 50° to 55° C. for 16 hours in an aqueous solution containing 30% hydrogen peroxide and 2% sulfuric acid. The final product had a total cation-exchange capacity of 8.0 milliequivalents per gram (dry basis) including a salt-splitting capacity of 2.4 milliequivalents per gram (dry).

Ion-exchange resins like that of Example I above were made by reacting copolymers of vinyl thiocyanate and divinylbenzene with 15% aqueous solutions of other oxidizing agents including nitric acid, potassium permanganate and potassium dichromate; but it must be pointed out that none of these reacted as satisfactorily as did hydrogen peroxide. For this reason, the use of aqueous solutions of hydrogen peroxide—particularly basic solutions—are much preferred.

I claim:

1. A process for preparing cation-exchange resins which comprises reacting an aqueous solution of an oxidizing agent at a temperature from about room temperature to the boiling point of the solution with an insoluble copolymer of vinyl thiocyanate and at least about 0.5 mole percent of a copolymerizable compound containing at least two non-conjugated groups having the structure $CH_2=C<$ to convert thiocyanate groups to sulfonic acid groups.

2. A process for preparing cation-exchange resins which comprises reacting an aqueous solution of an oxidizing agent at a temperature from about room temperature to the boiling point of the solution with an insoluble copolymer of vinyl thiocyanate and at least about 0.5 mole percent of divinylbenzene to convert thiocyanate groups to sulfonic acid groups.

3. The process of claim 2 in which the oxidizing agent is an aqueous solution of hydrogen peroxide.

4. A process for preparing cation-exchange resins which comprises taking an insoluble copolymer of (a) vinyl thiocyanate, (b) at least about 0.5 mole percent of a copolymerizable compound containing at least two non-conjugated groups of the structure $CH_2=C<$, and (c) a lower alkyl ester of an acid from the class consisting of arcylic and methacrylic acids, hydrolyzing alkyl ester groups of (c), and thereafter reacting the resultant product with an aqueous solution of an oxidizing agent at a temperature from about room temperature to the boiling point of the solution to convert thiocyanate groups to sulfonic acid groups.

5. A process for preparing cation-exchange resins which comprises first reacting an insoluble copolymer of (a) vinyl thiocyanate, (b) at least about 0.5 mole percent of divinylbenzene and (c) methyl acrylate with a solution of an alkali metal hydroxide to hydrolyze acrylate groups therein to carboxyl groups and thereafter reacting the resultant product with an aqueous solution of hydrogen peroxide at a temperature from about room temperature to the boiling point of the solution to convert thiocyanate groups to sulfonic acid groups.

6. A process for preparing cation-exchange resins which comprises first reacting an insoluble copolymer of (a) vinyl thiocyanate, (b) at least about 0.5 mole percent of divinylbenzene and (c) ethyl acrylate with a solution of an alkali metal hydroxide to hydrolyze acrylate groups therein to carboxyl groups and thereafter reacting the resultant product with an aqueous solution of hydrogen peroxide at a temperature from about room temperature to the boiling point of the solution to convert thiocyanate groups to sulfonic acid groups.

7. A process for preparing cation-exchange resins which comprises first reacting an insoluble copolymer of (a) vinyl thiocyanate, (b) at least about 0.5 mole percent of divinylbenzene and (c) methyl methacrylate with a solution of an alkali metal hydroxide to hydrolyze methacrylate groups therein to carboxyl groups and thereafter reacting the resultant product with an aqueous solution of hydrogen peroxide at a temperature from about room temperature to the boiling point of the solution.

8. A process for preparing cation-exchange resins which comprises first reacting an insoluble copolymer of (a) vinyl thiocyanate, (b) at least about 0.5 mole percent of divinylbenzene and (c) ethyl methacrylate with a solution of an alkali metal hydroxide to hydrolyze acrylate groups therein to carboxyl groups and thereafter reacting the resultant product with an aqueous solution of hydrogen peroxide at a temperature from about room temperature to the boiling point of the solution to convert thiocyanate groups to sulfonic acid groups.

References Cited in the file of this patent

Schildknecht: "Vinyl and Related Polymers," John Wiley & Sons, Inc., New York, page 638 (1952).